April 6, 1943.    C. H. CLOSS    2,315,772
MEANS FOR EXTERMINATING INSECTS
Filed May 23, 1941
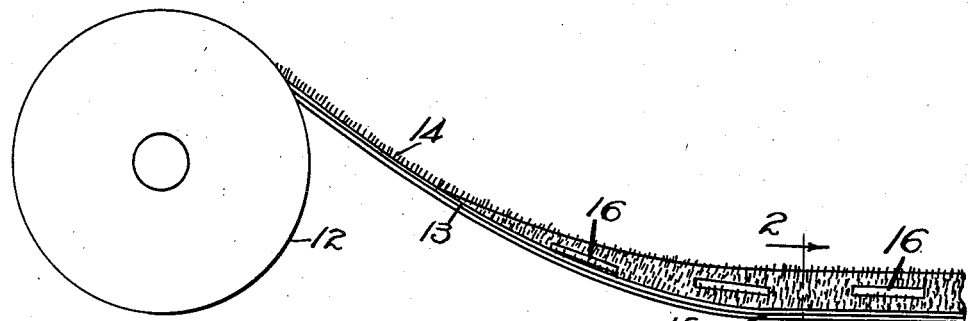
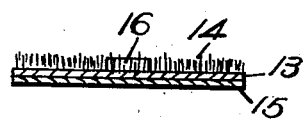
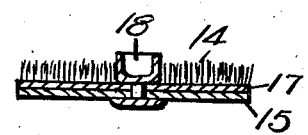
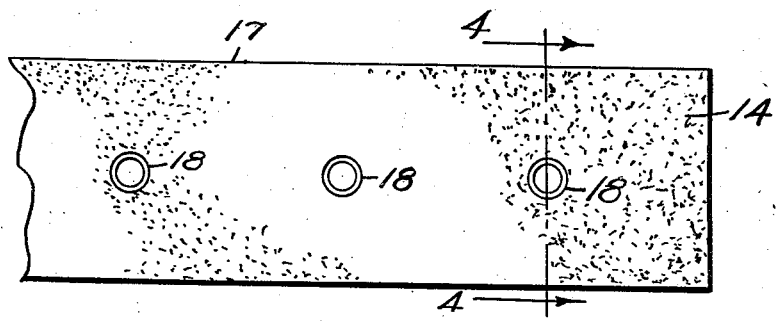
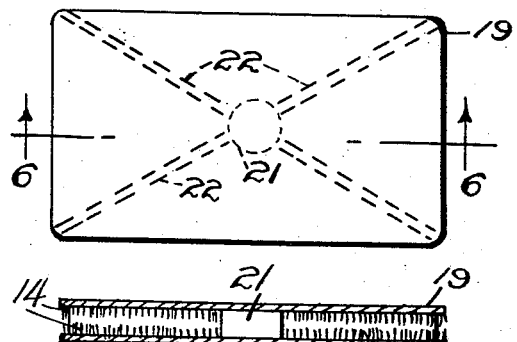
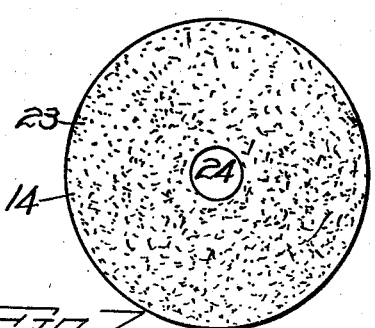
INVENTOR.
CARL H. CLOSS
BY Rollandet, McGrew & Campbell
Attorneys.

Patented Apr. 6, 1943

2,315,772

UNITED STATES PATENT OFFICE 2,315,772

MEANS FOR EXTERMINATING INSECTS

Carl H. Closs, Denver, Colo.

Application May 23, 1941, Serial No. 394,808

5 Claims. (Cl. 43—131)

This invention relates to an improved method and means for exterminating insects or the like.

A general object is to provide an economical method and means for insect extermination that will operate conveniently and efficiently, yet with safety to persons and animals.

A further object is to provide a method and means for exterminating insects such as cockroaches, that readily can be installed in any desired position in out-of-the-way places, either before or after the presence of obnoxious insects is noted.

More specifically, an object of the invention is to surround insect bait or lure, inclusive of food, with a poisonous material placed on a nap-like or porous surface where insects will walk through it, with the poison retained in or on the nap or pores avoiding accidental loss therefrom by which it would become a source of danger to persons or animals.

Other objects and advantages reside in details of design and construction which will be more fully disclosed in the following description and in the drawing wherein like parts have been similarly designated and in which:

Figure 1 is an elevation of a device made according to a preferred form of the invention;

Figure 2 is a typical cross section thereof, as indicated by line 2—2 of Figure 1;

Figure 3 is a plan view of a device made according to a slightly modified form of the invention;

Figure 4 is a sectional view taken along line 4—4 of Figure 3;

Figure 5 is a plan view of a device that embodies a further modified form of the invention;

Figure 6 is a sectional view along line 6—6 of Figure 5; and

Figure 7 is a plan view of still another device made according to the present inventive concept.

In order to disclose operative reductions to practice of this invention, the accompanying drawing will be described in some particularity. However, this disclosure only sets forth typical examples and the claims measure the scope of the invention.

In the drawing, reference character 12, Figure 1, represents a spool or reel upon which is wound a flexible strip or ribbon of cloth, paper or the like 13, having a nap-like surface 14 on one side and provided with an adhesive or "Scotch tape" strip 15, opposite the nap surface.

Along the strip 13 are quantities of insect bait 16 which may or may not be poisonous and which are to be made of any suitable material such as sugar or sweetened material or anything else that will attract or lure the insects. The bait may be attached to strip 13 in any suitable manner such as with glue, pins, staples, sewing, etc., or it may be of such a nature as to stick by itself.

Preferably the bait 16 is applied at intervals to strip 13, as illustrated, but may be continuous if desired. The spacing simplifies handling, particularly in severing portions of the strip 13 to provide an encompassing nap surface about the portion or portions of bait put into service. If desired, the strip may be scored at intervals along its length to facilitate the severing operation.

The nap 14 is thoroughly impregnated with an insect poison, preferably in dry powder form, such as sodium fluoride, arsenic compositions, hellebore compositions, or the like. However, any suitable insect poison, wet, dry or gaseous, may be used on the nap surface, to surround the bait.

The user tears or cuts off a piece of the strip 13, inclusive of the nap surface, the adhesive surface, and at least one bait, and places the same where desired, usually in a dark, out-of-the-way location. The material will stick where placed, even in upright or overhanging locations. The insects will be attracted by the bait and in walking through and over the impregnated nap, their legs will be coated with the poison which they will afterwards get into their mouths and swallow.

Close study of insects' habits shows that they "lick" their legs when any foreign matter is on them and they will thus be exterminated. Likewise, the presence of the poison in the nap or porous surfaces causes a permeating action which serves to distribute the poison effectively over the bodies of the insects in their travel to and from the bait or lure.

The advantages in such a method and means as this, include convenience, safety from access to children and pets because the material may be placed out of their sight and reach. Furthermore, poison placed on the nap is far safer than a tablet, bottle or package of the poison, or loose, granular poison, because it cannot be mistaken for something harmless or spread indiscriminately as often occurs where such a powder is kept in a private or commercial kitchen, bakery or the like.

In Figure 3, the strip of material 17 is flat and is provided with similar poison impregnated nap 14 and adhesive 15. Cups 18 are attached to the material 17 as by riveting or in any desired manner, at spaced intervals, into which any suitable bait may be placed by the user. The material 17 can be manufactured and sold to the user in any desired size, and sections can be cut or torn off for use or the entire strip can be placed in use if preferred.

Other means for locating or attaching suitable bait may be employed, such as push-out openings in strip 17, for example. In the forms of the invention that use "Scotch tape" adhesive, the impregnated material can be stuck almost anywhere and then moved, if desired, and stuck in another location thus making for convenience and economy.

Figures 5 and 6 illustrate an upper layer 19 of stiff material, such as cardboard, and a lower layer 20 spaced therefrom by diagonally arranged connecting walls 22 that hold the parts 19 and 20 in properly spaced relationship. Between the upper and lower layers 19 and 20, is a quantity of suitable bait 21 that is accessible from all sides to insects. The inner surfaces of the spaced layers 19 and 20 are provided with nap and impregnated with poison so that insects walking toward the bait therebetween will be coated from above and below. The connecting partitions or walls 22 can be arranged as desired, and may be a bait material if desired.

Figure 7 illustrates another form in which the present invention is embodied in a single disk or pad 23 having an upper nap surface 14 and a central bait 24. The pad 23 can be made of any suitable size and shape and can be sold in packages of one or more as desired.

The various structural features are interchangeable in the various forms and all these forms are well suited for use in the home, or in hotels, restaurants, food factories, bakeries, ships, army camps, or any other place where a convenient, safe, and efficient method and means for exterminating cockroaches, ants, beetles or any other obnoxious insects are desired.

While in preferred practice some form of bait or lure is used as by initially placing food or the like on the impregnated sheets or strips, it will be understood that the bait feature is not essential under all conditions.

For example, in locations where insects are known to frequent and they have runways, a sheet or strip of porous or nap-impregnated material located in such runway will be sufficient to attain the desired ends.

Likewise, for certain uses it will be desirable to provide a cup or other receptacle on the impregnated surface and allow the user to place food or other lure therein in accordance with the preference of the insects intended to be exterminated.

Also, for convenience in handling, it may be preferable to provide non-impregnated areas on the strips permitting severance of portions of the desired size without personal contact with impregnated surfaces. Where such feature is employed, the different areas may be differentially colored to facilitate use.

In the form illustrated in Figures 5 and 6, the article is particularly effective for the extermination of obnoxious insects having a natural tendency to conceal themselves from humans. The enclosure provided by the doubled wall construction induces such insects to seek concealment within the enclosure.

In the various forms described and illustrated, it will be understood that a sufficient quantity of poison can be applied to and retained in or on the nap or porous surface to insure adequate distribution on the bodies of the insects when they move through the same. In addition to the benefits thus derived, the arrangement is also particularly valuable in preventing displacement or accidental loss of poison content which might be a source of danger in and about the establishment in which the article is used.

For convenience in packaging, it will be desirable to insert a strip of material such as Cellophane, glazed paper or the like against the adhesive surface at the time it is wound upon spool 12, and another method of attaining the same result is to use two strips 13 with the naps 14 thereof in engaging relation.

From the foregoing, it will be apparent that the present invention gives a control both before and after the presence of insects is noted, and provides a stable, poisoned area which is long lasting and at all times efficient over the normal period of its use.

Changes and modifications may be availed of within the spirit and scope of the invention as defined in the hereunto appended claims.

What I claim and desire to secure by Letters Patent is:

1. An insect exterminator of the character described, comprising a body portion of sheet-like form having a nap surface on one face of the sheet, a quantity of dry, powdered poison distributed throughout the nap surface in adhering relation thereto, and an insect lure on the nap surface spaced inwardly a substantial distance from the marginal edge of said surface.

2. An insect exterminator of the character described, comprising a body portion of sheet-like form having a nap surface on one face of the sheet, a quantity of dry, powdered poison distributed throughout the nap surface in adhering relation thereto, an insect lure on the nap surface spaced inwardly a substantial distance from the marginal edge of said surface, and means on the face of the sheet opposite the nap surface for holding the sheet on a surface over which insects travel.

3. An insect exterminator of the character described, comprising a body portion of sheet-like form having a nap surface on one face of the sheet, a quantity of dry, powdered poison distributed throughout the nap surface in adhering relation thereto, an insect lure on the nap surface spaced inwardly a substantial distance from the marginal edge of said surface, and an adhesive coating on the face of the sheet opposite the nap surface for holding the sheet on a surface over which insects travel.

4. As an article of manufacture, a ribbon of flexible material adapted to be wound upon a reel, said ribbon having a nap-like surface, adhesive means on the side of the ribbon opposite said nap-like surface, a quantity of dry, powdered poison distributed throughout the nap surface in adhering relation thereto, and edible insect lures at intervals along the nap-like surface in spaced relation to the marginal edges of said surface.

5. An insect exterminator of the character described, comprising a body formed of two substantially co-extensive sheets, means for holding the same in spaced relationship, the opposed faces of said sheets having nap-like surfaces, a quantity of dry, powdered poison distributed throughout the nap-like surfaces, and an edible insect lure held between the opposed faces and inwardly a substantial distance from the marginal edges of said surfaces.

CARL H. CLOSS.